United States Patent
Barton

(10) Patent No.: US 9,844,765 B2
(45) Date of Patent: Dec. 19, 2017

(54) HYDROGEN GAS GENERATOR

(71) Applicant: Intelligent Energy Inc., San Jose, CA (US)

(72) Inventor: Russell H. Barton, Loughborough (GB)

(73) Assignee: INTELLIGENT ENERGY INC., San Jose, CA (US)

( * ) Notice: Subject to any disclaimer, the term of this patent is extended or adjusted under 35 U.S.C. 154(b) by 81 days.

(21) Appl. No.: 14/683,054

(22) Filed: Apr. 9, 2015

(65) Prior Publication Data
US 2015/0217267 A1  Aug. 6, 2015

Related U.S. Application Data

(63) Continuation of application No. PCT/US2013/054826, filed on Aug. 14, 2013.
(Continued)

(51) Int. Cl.
*H01M 8/04* (2016.01)
*H01M 8/06* (2016.01)
(Continued)

(52) U.S. Cl.
CPC ......... *B01J 19/2445* (2013.01); *C01B 3/0005* (2013.01); *C01B 3/0084* (2013.01);
(Continued)

(58) Field of Classification Search
CPC ....... C01B 3/0005; C01B 3/02; C01B 3/0084; C01B 2203/085; B01J 19/2445;
(Continued)

(56) References Cited

U.S. PATENT DOCUMENTS

| 4,932,550 A | * | 6/1990 | Moucha | A47J 27/092 220/203.09 |
| 2003/0080131 A1 | * | 5/2003 | Fukuo | B60R 7/04 220/264 |

(Continued)

FOREIGN PATENT DOCUMENTS

| EP | 1467138 | 10/2004 |
| FR | 2957745 | 9/2011 |

(Continued)

OTHER PUBLICATIONS

International Search Report dated Oct. 31, 2013, issued in International patent application PCT/US2013/054826.

*Primary Examiner* — Muhammad Siddiquee
(74) *Attorney, Agent, or Firm* — Baker & Hostetler LLP

(57) ABSTRACT

A hydrogen generator, a fuel pellet assembly for use in the hydrogen generator and a fuel cell system are disclosed. The hydrogen generator includes a housing having a lid pivotally connected to a base and a strip having a plurality of heaters on one side and a second plurality of heaters on the opposite side. A first cartridge is disposed on one side of the strip and a second cartridge is disposed on the opposite side. Each of the first and second cartridges has a plurality of fuel pellets, each including a hydrogen-containing material that will release hydrogen gas when heated. The heaters are selectively activated to heat one or more fuel pellets to initiate the release of hydrogen gas.

21 Claims, 9 Drawing Sheets

Related U.S. Application Data

(60) Provisional application No. 61/715,882, filed on Oct. 19, 2012.

(51) Int. Cl.
*B01J 19/24* (2006.01)
*C01B 3/00* (2006.01)
*C01B 3/02* (2006.01)
*H01M 8/04082* (2016.01)
*H01M 8/0612* (2016.01)

(52) U.S. Cl.
CPC ............ *C01B 3/02* (2013.01); *H01M 8/04208* (2013.01); *H01M 8/0631* (2013.01); *B01J 2219/0015* (2013.01); *B01J 2219/00051* (2013.01); *B01J 2219/24* (2013.01); *C01B 2203/085* (2013.01); *Y02E 60/324* (2013.01)

(58) Field of Classification Search
CPC ............ B01J 2219/0015; B01J 2219/24; B01J 2219/00051; H01M 8/0631; H01M 8/04208; Y02E 60/324
See application file for complete search history.

(56) References Cited

U.S. PATENT DOCUMENTS

| | | | |
|---|---|---|---|
| 2004/0013927 A1* | 1/2004 | Lawrence | H01M 8/04186 429/492 |
| 2005/0095470 A1 | 5/2005 | Harding et al. | |
| 2008/0280180 A1* | 11/2008 | Correa | B01J 8/003 429/479 |
| 2011/0033342 A1* | 2/2011 | Horiguchi | C01B 3/02 422/105 |
| 2011/0220638 A1 | 9/2011 | Wei et al. | |
| 2014/0044605 A1* | 2/2014 | Langan | B01J 7/00 422/198 |

FOREIGN PATENT DOCUMENTS

| | | |
|---|---|---|
| FR | 2957911 | 9/2011 |
| GB | 2465313 | 5/2010 |
| GB | 2469248 | 10/2010 |
| WO | 2011085915 | 7/2011 |

* cited by examiner

HYDROGEN GAS GENERATOR

CROSS-REFERENCE TO RELATED APPLICATIONS

This patent application is a Continuation of international patent application PCT/US2013/054826 filed Aug. 14, 2013, which claims priority to Provisional patent application 61/715,882 filed Oct. 19, 2012, the disclosures of which are incorporated by reference in their entirety.

FIELD OF THE INVENTION

The present invention generally relates to a hydrogen gas generator, and more particularly relates to a hydrogen generator for providing hydrogen gas to a fuel cell system.

BACKGROUND OF THE INVENTION

Interest in fuel cell batteries as power sources for portable electronic devices has grown. A fuel cell is an electrochemical cell that uses materials from outside the cell as the active materials for the positive and negative electrodes. Because a fuel cell does not have to contain all of the active materials used to generate electricity, the fuel cell can be made with a small volume relative to the amount of electrical energy produced compared to other types of batteries.

Fuel cells can be categorized according to the types of materials used in the positive electrode (cathode) and negative electrode (anode) reactions. One category of fuel cell is a hydrogen fuel cell using hydrogen as the negative electrode active material and oxygen as the positive electrode active material. When such a fuel cell is discharged, hydrogen is oxidized at the negative electrode to produce hydrogen ions and electrons. The hydrogen ions pass through an electrically nonconductive, ion permeable separator and the electrons pass through an external circuit to the positive electrode, where oxygen is reduced.

In some types of hydrogen fuel cells, hydrogen is formed from a fuel supplied to the positive electrode side of the fuel cell, and hydrogen is produced from the supplied fuel. In other types of hydrogen fuel cells, hydrogen gas is supplied to the fuel cell from a source outside the fuel cell. A fuel cell system can include a fuel cell battery, including one or more fuel cells (such as a fuel cell stack), and a hydrogen source, such as a fuel tank, a hydrogen tank or a hydrogen gas generator. Gas generators that supply gas to a fuel cell can be an integral part of the fuel cell system, they can be removably coupled to the fuel cell system, or they can include replaceable components containing reactants. A removable gas generator can be replaced with another one when the gas producing reactants have been consumed. Removable gas generators can be disposable (intended for only a one-time use) or refillable (intended for use multiple times) to replace consumed reactant materials.

A hydrogen gas generator uses one or more materials containing hydrogen that can react to produce hydrogen gas. Hydrogen generators can produce hydrogen using a variety of materials and a variety of methods for initiating the release of hydrogen gas. The release of hydrogen gas can be initiated in various ways, such as hydrolysis and thermolysis. For example, two reactants can produce hydrogen and byproducts. Examples of hydrogen-containing materials include liquid or gaseous hydrocarbons (such as methanol), hydrides (such as metal hydrides and chemical hydrides), alkali metal silicides, metal/silica gels, water, alcohols, dilute acids, and organic fuels (such as N-ethylcarbazon and perhydrofluorene). A hydrogen-containing compound can react with another reactant to produce hydrogen gas when the reactants are mixed together, in the presence of a catalyst, heat or an acid, or a combination thereof. A hydrogen-containing compound can be heated to evolve hydrogen, e.g., by desorption or a thermochemical decomposition reaction.

In selecting hydrogen-containing materials for use in a hydrogen generator, consideration may be given to the following: (a) stability during long periods of time when the hydrogen generator is not in use, (b) ease of initiation of release of hydrogen gas, (c) the amount of energy that must be provided to sustain the release of hydrogen gas, (d) the maximum operating temperature for the release of hydrogen gas, and (e) the total volume of hydrogen that can be produced per unit of volume and per unit of mass of the hydrogen-containing material(s).

In order to provide hydrogen over a long period of time without developing a very high pressure within the hydrogen generator, it is desirable to generate the hydrogen on an as-needed basis. This requires controlling the release of hydrogen gas, such as by reacting only a limited quantity of reactant at a time.

It is desirable to provide a hydrogen generator capable of supplying hydrogen gas to a fuel cell battery that has one or more of the following features: capable providing a large total volume of hydrogen gas per unit of mass and per unit of volume of the hydrogen generator, capable of controlling the reaction of the reactant(s) to efficiently provide hydrogen on an as-needed basis without producing an excessive internal pressure within the hydrogen generator, able to operate at or below a desired maximum temperature, all or a portion of the hydrogen generator in a fuel cell system can be replaced after all of the hydrogen in the hydrogen-containing materials has been released, long-term durability and reliability and easy and economic manufacturing.

These and other advantages of the invention will be further understood and appreciated by those skilled in the art by reference to the following written specification, claims, and appended drawings.

SUMMARY OF THE INVENTION

According to one aspect of the present invention, a hydrogen gas generator is provided. The hydrogen generator includes a housing having a base connected to a lid, wherein the housing defines a chamber. The hydrogen generator also includes a heater assembly disposed in the chamber and including a strip and a first heater on a first side of the strip and a second heater on an opposite second side of the strip. The hydrogen generator further includes a first cartridge disposed on the first side of the strip and including a first fuel pellet in thermal communication with the first heater, wherein the first fuel pellet having a hydrogen-containing material that will release hydrogen gas when heated. The hydrogen generator further includes a second cartridge disposed on the second side of the strip and including a second fuel pellet in thermal communication with the second heater, wherein the second fuel pellet includes a hydrogen-containing material that will release hydrogen gas when heated.

Embodiments can include one or more of the following features:

the heater assembly includes a first plurality of heating elements on the first side of the strip and a second plurality of heating elements on the second side of the strip, wherein the first cartridge includes a first plurality of fuel pellets aligned in thermal communication with the first plurality of heating elements and the second cartridge includes a second plurality of fuel pellets aligned in thermal communication with the second plurality of heating elements;

each of the first and second cartridges includes a thermal insulating material substantially coating the fuel pellets;

the thermal insulation material of the first cartridge abuts the thermal insulation material of the second cartridge;

the first cartridge is disposed to interface with a bottom side of the strip and the second cartridge is disposed to interface with a top side of the strip;

the strip is pivotally connected to the housing such that the strip pivots to allow access to the first cartridge;

the lid is pivotally connected to the base and pivots between open and closed positions;

one of the lid and base includes a plurality of slots and the other of the lid and base includes a plurality of pins such that the pins move along a cammed surface of the slots as the lid moves between open and closed positions;

the lid further may move axially away from the base;

the hydrogen generator has a seal disposed between the lid and the base;

the hydrogen generator has an interlock mechanism that locks the lid closed relative to the base when pressure in the housing exceeds a predetermined pressure;

the hydrogen generator has a hydrogen outlet coupled to the housing in fluid communication with each of the fuel pellets to provide a hydrogen outlet path;

the hydrogen generator has a controller for controlling activation of each of the heating elements to selectively heat one or more of the fuel pellets at a time;

the hydrogen generator is adapted to be coupled to a fuel cell to supply hydrogen to the fuel cell;

the housing is removably connected to the fuel cell; and the fuel cell is located within the housing.

According to another aspect of the present invention, a fuel pellet assembly for a hydrogen generator is provided. The fuel pellet assembly includes a first cartridge having a first plurality of fuel pellets, the first cartridge having an exposed first side and second, third and fourth sides substantially covered by a first thermal insulation. The fuel pellet assembly also includes a second cartridge having a second plurality of fuel cells, the second cartridge having a first exposed side and second, third and fourth sides substantially covered by a second thermal insulation. The fuel pellet assembly further includes a heater strip comprising a first side, an opposite second side, a first plurality of heater elements on the first side in thermally communication with the first side of the first cartridge, and a second plurality of heater elements on the second side in thermal communication with the second side of the cartridge, wherein the heater elements selectively heat one or more of the first and second plurality of fuel pellets.

Embodiments can include one or more of the following features:

the first thermal insulation of the first cartridge abuts the second thermal insulation of the second cartridge;

the second cartridge is located on top of the heater strip and the first cartridge is located below the heater strip; and the heater strip pivotally connects to a housing such that the strip pivots to allow access to the first cartridge.

According to a further aspect of the present invention, a fuel cell system is provided. The fuel cell system includes a fuel cell having a hydrogen gas inlet and a hydrogen generator. The hydrogen generator includes a hydrogen gas inlet, and a housing including a base pivotally connected to a lid, wherein the housing defines a chamber. The housing has a hydrogen gas outlet in fluid communication with the hydrogen gas inlet. The hydrogen generator includes a heater assembly disposed in the chamber and including a strip and a first heater on a first side of the strip and a second heater on an opposite second side of the strip. The hydrogen generator also includes a first cartridge disposed on the first side of the strip and including a first fuel pellet in thermal communication with the first heater, wherein the first fuel pellet includes a hydrogen-containing material that will release hydrogen gas when heated. The hydrogen generator also includes a second cartridge disposed on the second side of the strip and including a second fuel pellet in thermal communication with the second heater, wherein the second fuel pellet includes a hydrogen-containing material that will release hydrogen gas when heated.

According to yet a further aspect of the present invention, a hydrogen generator is provided. The hydrogen generator includes a housing having a base connected to a lid, wherein the housing defines a chamber. The hydrogen generator also includes a strip including a first plurality of electrical contacts on a first side of the strip and a second plurality of electrical contacts on an opposite second side of the strip. The hydrogen generator further includes a first cartridge disposed on the first side of the strip and having a first fuel pellet. The first fuel pellet includes a hydrogen-containing material that will release hydrogen gas when heated. A second cartridge disposed on the second side of the strip and includes a second fuel pellet. The second fuel pellet includes a hydrogen-containing material that will release hydrogen gas when heated. The hydrogen generator includes a first heating element arranged on or in the first fuel pellet and electrically coupled to the first plurality of electrical contacts, wherein the first plurality of electrical contacts provide electrical energy to the first heating element. The hydrogen generator also includes a second heating element arranged on or in the second fuel pellet and electrically coupled to the second plurality of electrical contacts, wherein the second plurality of electrical contacts provide electrical energy to the second heating element

DETAILED DESCRIPTION OF THE PREFERRED EMBODIMENTS

Figure 1:
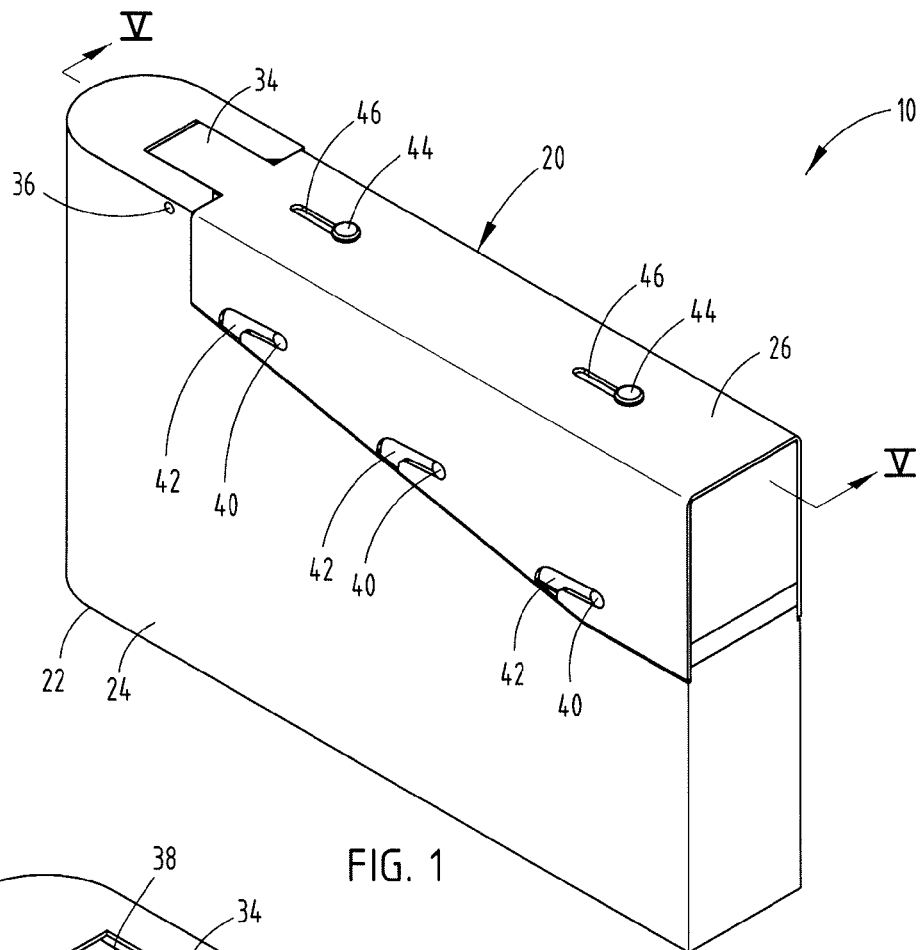
FIG. 1 is a perspective view of a hydrogen generator which incorporates various components of a fuel cell system therein, according to one embodiment.
Figure 2:
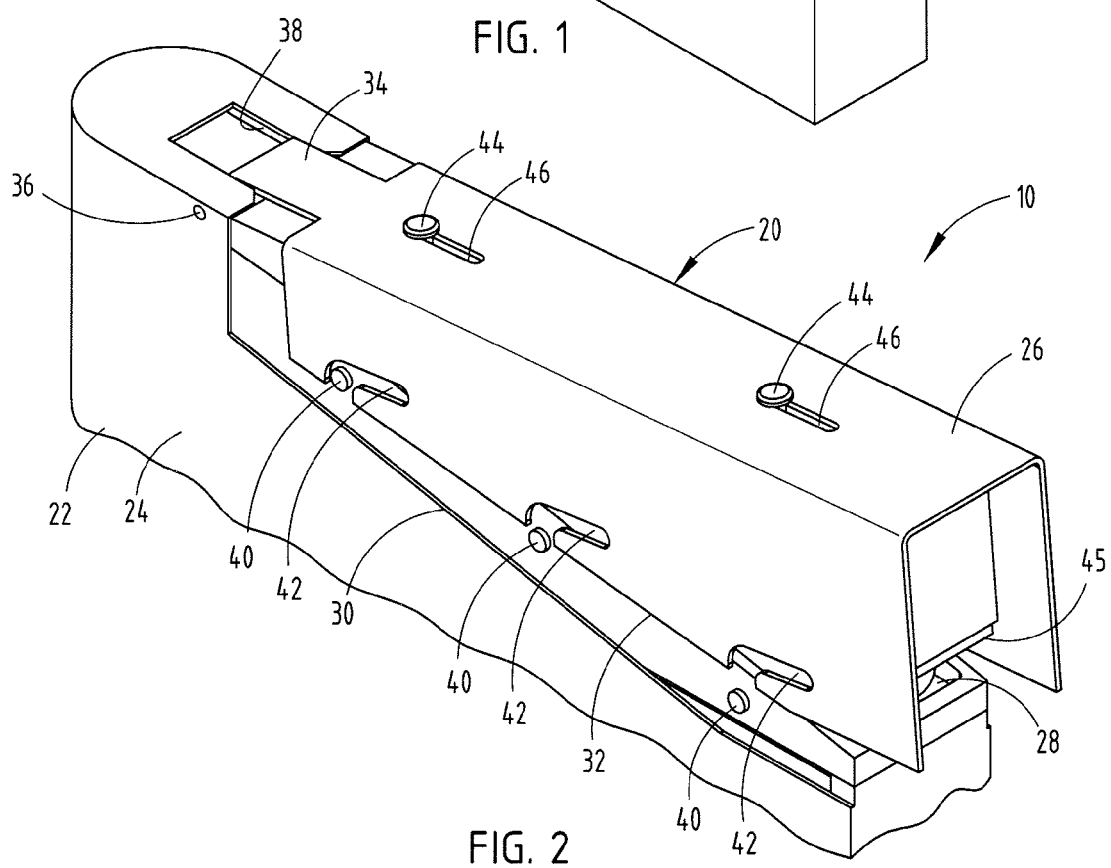
FIG. 2 is a perspective view of the hydrogen generator shown in FIG. 1 with the lid partially open.

A hydrogen generator that produces hydrogen gas, a fuel pellet assembly used in the hydrogen generator and a fuel cell system that employs the hydrogen generator are disclosed. The hydrogen gas generated by the hydrogen generator can be used by a hydrogen consuming system, such as the fuel cell system including a fuel cell battery that produces electricity for an electronic device. The hydrogen generator includes a housing having a base connected to a lid and defining a chamber. The hydrogen generator may incorporate various components of a fuel cell system in the housing, according to one embodiment. According to another embodiment, the hydrogen generator may be removably connected to a fuel cell system such that the hydrogen generator may serve as a replaceable cartridge. The hydrogen generator can be re-used at a minimum added expense by replacing the hydrogen generator or fuel cartridges disposed therein which contain hydrogen-containing materials. The hydrogen generator can be disposed of after use, can be re-used by refilling it with fresh hydrogen-containing materials, or the hydrogen generator portion of it can be recycled.

The size and shape of the hydrogen generator housing can be varied depending on the circumstances. For example, the housing can have a prismatic shape, such as a generally rectangular shape, or any other shape. The housing has a base and a lid that define top, bottom and four lateral side walls. The lid pivots relative to the base to allow the housing to open to allow access to the fuel cartridges and a heater assembly within the chamber. One of the lid and base includes a plurality of slots and the other of the lid and base includes a plurality of pins such that the pins matingly engage and move along a cammed surface of the slots as the lid moves between open and closed positions. In addition, the lid may move axially away from the base, such as along a longitudinal direction. The lid may include a tongue having a pivoting pin disposed within a sliding slot to allow the elongated axial movement of the lid relative to the base as the pins and slots follow the cammed surfaces of the slots between open and closed lid positions. A seal may be disposed between the lid and base to provide a gas tight seal of the hydrogen generator chamber.

The hydrogen generator includes a heater assembly disposed in the chamber of the housing. The heater assembly includes a strip having a first or bottom side and an opposite second or top side. A first heater is provided on the first side of the strip and a second heater is provided on the opposite second side of the strip. The heater assembly may include a first plurality of heaters on the first side of the strip and a second plurality of heaters on the second side of the strip. The strip is pivotally connected to the base near one end such that the strip may pivot to allow access to space both above and below the strip when the lid is open relative to the base. Additionally, the strip may include a plurality of electrical conductors for supplying electrical power to each of the heaters.

The hydrogen generator further includes a first fuel cartridge disposed on the first side of the strip and a second fuel cartridge disposed on the second side of the strip. The first cartridge includes a first fuel pellet in thermal communication with the first heater, and the second cartridge includes a second fuel pellet in thermal communication with the second heater. The first cartridge may include a plurality of fuel pellets in thermal communication with a plurality of first heaters and the second cartridge may include a plurality of second fuel pellets in thermal communication with the plurality of second heaters. Each of the first and second fuel pellets includes a hydrogen-containing material that will release hydrogen gas when heated.

Each of the first and second fuel cartridges may have a plurality of fuel pellets. Each fuel pellet has a solid composition, which can be formed in a prismatic shape, such as generally rectangular shape according to one embodiment. The fuel pellets may have other shapes and sizes. The fuel pellets may be arranged in one or more rows and are spaced apart to provide thermal isolation from one another. A thermal insulation material may be disposed in the space between adjacent fuel pellets to further thermally insulate the fuel pellets from one another. As such, individual fuel pellets may be heated to generate hydrogen, while thermally isolating the fuel pellet from adjacent fuel pellets so that unintended initiation of a release of hydrogen in one fuel pellet as a result of heat transfer from an adjacent pellet is prevented. The first and second fuel cartridges may further each include a thermal insulation material substantially coating the fuel pellets. The thermal insulation material of the first cartridge may abut the thermal insulation material of the second cartridge such that the first and second cartridges sandwich the strip of the heater assembly. Each of the first and second cartridges may include an exposed side which interfaces with the respective heaters and second, third and fourth sides substantially covered by the thermal insulation. As such, the thermal insulation material contains the heat to regions defining a single fuel pellet such that individual fuel pellets may be selectively heated one or more at a time as determined by control circuitry.

The housing also includes an outlet and a hydrogen flow path from each fuel pellet to a hydrogen outlet path. The outlet may include a valve that is operatively coupled to a hydrogen consuming device, such as a fuel cell battery. The hydrogen generator may be used in a fuel cell system to supply generated hydrogen on an as needed basis to a fuel cell or may be used in other hydrogen consuming devices.

One or more hydrogen-containing materials are contained in a solid composition that is formed into the fuel pellet. The formation of the fuel pellet may include a simple process, such as molding, extruding, depositing, coating, printing, and so on. In one embodiment, the fuel pellet is formed into a prismatic shape such as a rectangular shape, so that multiple fuel pellets may be arranged side-by-side in a volume efficient manner. The size of the fuel pellets, including the height, the width, and length, can be chosen to provide a desired quantity of hydrogen, based on the size of the fuel cell battery and the power requirements of the electronic device, as well as the volume available in the hydrogen generator.

The solid bodies containing the hydrogen-containing material can be in various forms, such as tablets, wafers, cakes, briquettes, coatings, and so on, all referred to herein as fuel pellets. Hydrogen-containing materials and optional components of the solid composition are described below. The solid bodies can have various shapes, such as rectangles, circles, ovals, squares, triangles, trapezoids, wedges, irregular shapes, and so on. The solid bodies can be made using a suitable process, such as molding, extruding, depositing, briquetting, coating, printing, and so on. As used below, the term "pellet" refers to a solid body of the hydrogen-containing material, and is not limited to a particular form, shape, or method of manufacture, unless otherwise stated. The pellets can be sized and shaped to fit into the cartridges in a volume-efficient manner. The pellet size and composition can be chosen to provide a desired quantity of hydrogen from each pellet, based on the size of the fuel cell battery and the power requirements of the electronic device, for example.

The hydrogen-containing material in the fuel pellets contains hydrogen that is released as hydrogen gas when the fuel pellet is heated sufficiently by way of the heating elements. The hydrogen gas released travels through a hydrogen flow path from the pellet to a hydrogen outlet in the housing. The hydrogen outlet can include a valve to control the hydrogen flow.

At least one hydrogen-containing material that can release hydrogen gas when heated is included in each fuel pellet. More than one such material can be included. Examples include alkali, alkaline earth, transition metal and mixed metal hydrides ($LiH$, $LiBH_4$, $LiAlH_4$, $NaBH_4$, $NaAlH_4$, $AlH_3$), ammonia borane, ammonium nitrate, ammonium halides (e.g., $NH_4F$, $NH_4Cl$ and $N_2H_6Cl_2$), lithium imide, lithium amide, hydrogen storage materials that can reversibly absorb and desorb hydrogen (e.g., $AB_5$ and $AB_2$ type alloys such as titanium-manganese, mischmetal-nickel, lanthanum-nickel-cobalt and lanthanum-nickel alloys), carbon based nano-materials (e.g., graphene and carbon nanotubes), and various combinations including the above materials.

The hydrogen-containing material can also contain one or more additives. Examples of additives include binders (e.g., acrylates and styrene block copolymers), stabilizing compounds (e.g., solid bases), reaction accelerators (e.g., solid acids), catalysts (e.g., $Fe_2O_3$, $TiCl_3$), ignition materials as described below, thermally conductive materials (e.g., metals, graphites and combinations and composites thereof), and so on. Rubber cement may be added to the hydrogen-containing material as a binder (e.g., 50%) to hold the hydrogen-containing material together as the feed member flexes.

The heating elements heat the hydrogen-containing material to result in the release of hydrogen. Multiple heating elements can advantageously be activated simultaneously to heat multiple pellets at one time, when more hydrogen is required. The heating element may include an electrical heater, according to one embodiment. Various types of electrical powered heating elements can be used. Examples of heating elements include resistive heaters, inductive heaters, infrared heaters, laser heaters, microwave heaters, semiconductive bridges, and so on. Examples of suitable types of heating elements include resistive heating elements in the form of a wire, a ribbon, or a strip. Suitable materials include metals and alloys (e.g., nickel-chromium alloys, iron-chromium-aluminum alloys, copper-nickel alloys, and other types of alloys), intermetallic compounds (e.g., molybdenum, disilicides), and metal ceramics. The electrical current source for the heating elements can be a battery, fuel cell, or other source of electrical energy within the hydrogen generator, elsewhere in the system, or even outside the system (e.g., within a device being supplied with power from a fuel cell battery in the system).

The heating element can be the sole means of applying heat to the hydrogen-containing material, or an ignition material (a material that will react exothermically, producing heat for the release of hydrogen gas from the hydrogen-containing material) can be included in the fuel pellet, such as in a mixture with the hydrogen-containing material or as a separate layer or portion of the pellet. If a thermal decomposition reaction of the hydrogen-containing material generates heat, it may be possible to reduce or stop applying heat after the reaction is initiated. An ignition material can be used to supplement or replace the application of more heat by the heating elements, thereby reducing the amount of energy consumed by the hydrogen generator. Examples of ignition materials (some of which can also contribute to the hydrogen yield) include sodium borohydride; lithium borohydride; magnesium borohydride; calcium borohydride; ammonia borane; sodium nitrate; ammonium nitrate, lead peroxide; potassium permanganate; $MgFeH_x$ alloy; titanium-manganese alloy; iron powder or titanium hydride plus potassium perchlorate; manganese dioxide plus lithium aluminum hydride; nickel, iron or cobalt plus aluminum; zirconium plus lead chromate; iron (III) oxide plus aluminum; lithium aluminum hydride plus ammonium chloride; and sodium aluminum chloride plus sodium aluminum hydride or aluminum chloride.

The fuel pellets can be arranged within the cartridges in a variety of ways. For example, the plurality of fuel pellets can be arranged in a single layer containing one or more than one fuel pellet. Factors such as size and shape of the cartridge, compartment, and hydrogen generator, the volume of hydrogen to be produced by a cartridge, and simplicity of the heating elements can be considered in selecting a pellet arrangement.

While it may be desirable to initiate the release of hydrogen from more than one fuel pellet at a time, in order to prevent the uncontrolled initiation in adjacent pellets, it is desirable for individual pellets or groups of pellets to be thermally insulated from one another. This can be accomplished in various ways, including spacing pellets apart from each other, separating pellet layers with thermally insulated material (e.g., sheets or layers of thermally insulating material), placing thermal insulation between adjacent pellets or layers of pellets (e.g., containers or coatings made of thermally insulating material), and so on. Suitable thermal insulator materials include silica, silicon dioxide, silicon nitrides, silicon carbide, silica aerogel, alumina, alumina oxide, glass, glass wool, mineral wool, cellular glass, perlite, and polymers, such as polyimides and epoxy-amine composites.

A control system can be used to control the hydrogen generator. Operation of the control system, the heating assembly or both can be controlled in various ways. The control system can determine the need for hydrogen by monitoring the pressure within the fuel cell system, one or more electrical characteristics of the fuel cell battery, or one or more electrical characteristics of the electronic device, for example. The controller may communicate with the device or the fuel cell battery to determine when more hydrogen is needed. The control system can be completely or partially disposed in the hydrogen generator, the fuel cell battery, the electronic device being powered by the fuel cell battery, or any combination thereof. The control system can include a microprocessor or micro controller; digital, analog and/or hydride circuitry; solid state and/or electromechanical switching devices; capacitors, sensing instrumentation, and so on. The control system can control application of the heating elements to heat selected fuel pellets one or more at a time. The control system may heat fuel pellets remote from one another so as to spread out the heat generation within the cartridge.

The hydrogen flow path can include a channel extending through or around the fuel pellets or pellet layers. The channel can be a central channel, for example. Multiple channels can be present. The hydrogen generator can include various filters and/or purification units to remove undesired reaction byproducts and other contaminants from the hydrogen gas.

The hydrogen generator can also include various fittings, valves and electrical connections for providing hydrogen to and interfacing with the fuel cell battery and/or an electrical appliance being provided with power by the fuel cell system. For example, the hydrogen generator can have external electrical contacts to provide electrical connections between an external electrical current source and the internal electrically conductive connectors and heating elements. The hydrogen generator can include various safety features such as a pressure relief vent to release excessive pressure and a mechanism to stop the energization of the heating elements if the internal temperature exceeds an established limit.

The hydrogen generator may further include an interlock mechanism that locks the lid closed relative to the base when pressure in the housing exceeds a predetermined pressure. The interlock mechanism may include a spring biased interlock pin in fluid communication with the internal pressure within the housing, wherein the pin moves as a function of the pressure between a lock and unlocked position. When the pin is in the locked position, the lid is prevented from opening relative to the base such that a user may not open the housing when gas pressure exceeds a predetermined pressure.

In an alternative embodiment, the hydrogen generator as described above can be modified to include the heater elements as part of the pellets rather than disposed on a strip in the housing chamber. In this embodiment the strip would include electrical contacts rather than the heater elements, and the electrical contacts would be in electrical communication with the heater elements of corresponding adjacent pellets in order to provide electric energy for operation of the heater elements.

In this embodiment, the hydrogen generator includes a housing having a base connected to a lid, wherein the housing defines a chamber, and a strip having a first plurality of electrical contacts on a first side of the strip and a second plurality of electrical contacts on an opposite second side of the strip. The hydrogen generator also includes a first cartridge disposed on the first side of the strip and having a first fuel pellet, wherein the first fuel pellet comprises a hydrogen-containing material that will release hydrogen gas when heated and a second cartridge disposed on the second side of the strip and having a second fuel pellet, wherein the second fuel pellet comprises a hydrogen-containing material that will release hydrogen gas when heated. The hydrogen generator further includes a first heating element arranged on or in the first fuel pellet and electrically coupled to the first plurality of electrical contacts, wherein the first plurality of electrical contacts provide electrical energy to the first heating element. The hydrogen generator also includes a second heating element arranged on or in the second fuel pellet and electrically coupled to the second plurality of electrical contacts, wherein the second plurality of electrical contacts provide electrical energy to the second heating element.

The first heating element may include a first plurality of heating elements and the second heating element may include a second plurality of heating elements. Each of the first and second plurality of heating elements may be electrically coupled to a pair of contacts on the strip that supply electrical energy to the corresponding heating elements. The heating elements may be formed in respective fuel pellets such that each fuel pellet has a single heating element, or a plurality of heating elements may be employed in each fuel pellet. Each heating element may be provided on an exposed surface of a corresponding fuel pellet. The electrical contacts may be physically connected to terminals of the heating elements to provide the electrical coupling.

Referring to FIGS. 1-7B, a hydrogen generator 20 is generally shown having a fuel cell system 10 incorporated in the same housing. The hydrogen generator 20 includes a housing 22 defining a chamber which contains hydrogen generation components and further contains other components of the fuel cell system 10. The hydrogen generator 20 has a hydrogen gas outlet 12. The housing 22 may include electrical contacts (not shown) for providing electrical power to an electronically powered device, such as a computer. The fuel cell system 10 includes a fuel cell 14, also referred to herein as a fuel cell battery. The fuel cell battery 14 has a hydrogen gas input 15 shown connected to hydrogen gas outlet 12 via a fluid hose 13 to receive and consume hydrogen gas to generate electricity which, in turn, may be supplied to the electrically powered device. The fuel cell battery 14 generally includes a stack of fuel cells each having positive and negative electrodes as is generally known in the fuel cell art. The hydrogen gas generated by the hydrogen generator 20 may be used as the negative electrode active material and oxygen may be used as the positive electrode active material.

In addition, a controller 18 is illustrated included in the fuel cell system 10. The controller 18 may control the hydrogen generator 20 and its generation of hydrogen gas as desired to meet the needs of the fuel cell battery 14 to provide sufficient electrical power. It should be appreciated that the controller 18 may be located within the fuel cell housing or elsewhere within the fuel cell system 10 or the electrical device employing the fuel cell system 10. It should further be appreciated that the controller 18 could be located within the hydrogen generator 20 or fuel cell battery 14, according to other embodiments. The fuel cell system 10 can also include a cooling fan 16 for cooling the fuel cell battery 14.

The fuel cell system 10 includes the hydrogen generator 20 and its components as shown and described herein. The housing 22 generally has a prismatic shape, such as a rectangular shape formed by a base 24 and a lid 26 on top of the base 24. The lid 26 pivots relative to the base 24 between open and closed positions and, when closed, defines a closed chamber 28. The lid 26 is further configured to move axially away from the base 24 along the longitudinal axis thereof to allow the lid 26 to engage and disengage connectors provided on the base 24. The base 24 includes a pair of side walls 30 on opposite sides and a plurality (e.g., three) of pins 40 on each side wall 30 adapted to engage slots 42 provided in side walls 32 of lid 26. Slots 42 may include a cam-shaped surface such that the lid 26 is forced to follow the cam-shaped surface upon engagement and disengagement with pins 40. Further, the lid 26 includes a pair of slots 46 provided on the top wall for engaging pins 44 that allow and limit movement of the lid 26 relative to base 24. The lid 26 further has a tongue 34 connected to a pin 36 which slides within slot 38 of base 24. Tongue 34 thereby pivots about pin 36 and slides linearly within slot 38 to allow the lid 26 to slide longitudinally away from the base 24 and pivot relative to the base 24. A seal 45 is further shown disposed on the bottom edge surface 32 of lid 26 to sealingly engage the top edge surface of the base 24 to form a gas tight sealed closure to the hydrogen gas chamber 28 when the lid 26 is closed relative to the base 24. The seal 45 may include an O-ring seal or other shaped seal member.

Figure 3:
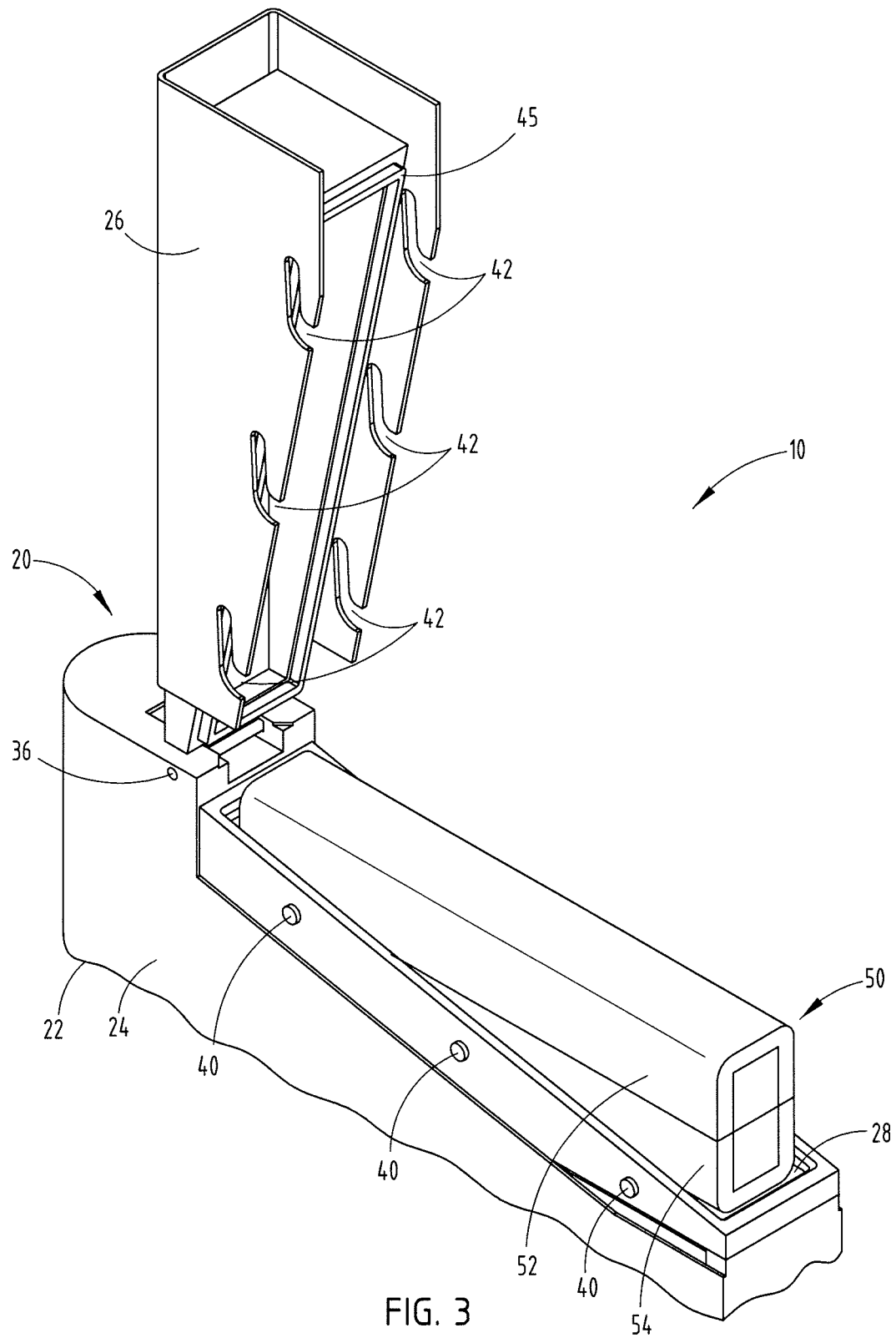
FIG. 3 is a perspective view of the hydrogen generator with the lid in the fully open position.
Figure 4:
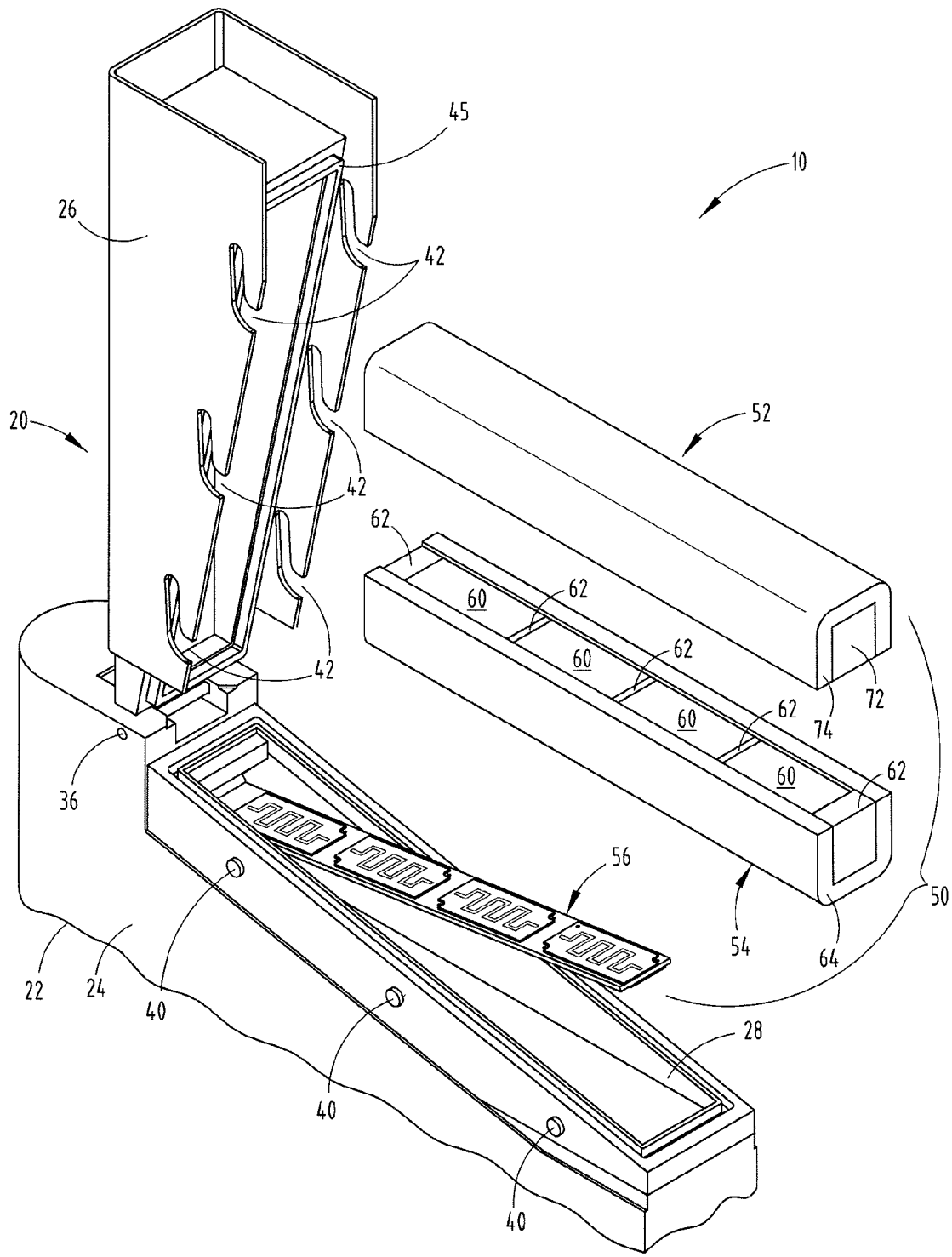
FIG. 4 is a perspective view of the hydrogen generator with the fuel cartridges shown removed from the housing.
Figure 5:
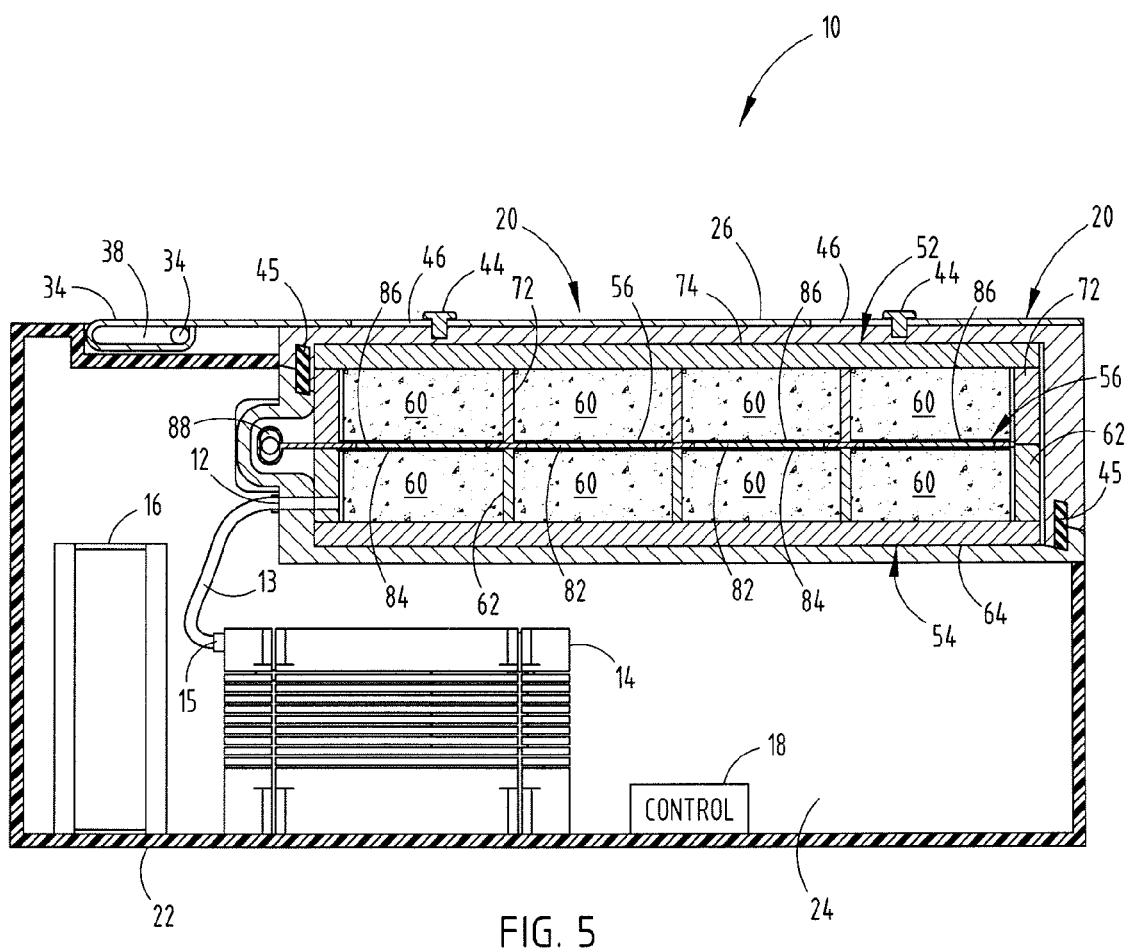
FIG. 5 is a cross-sectional view of the hydrogen generator taken through lines V-V of FIG. 1.

Disposed within the chamber 28 is a fuel pellet and heater assembly 50. The assembly 50 includes a heater assembly having a strip 56 having first and second opposite sides and one or more heaters or heater elements 84 and 86 disposed on each of the first and second opposite sides. The strip 56 is connected to the base 24 by way of a pivot pin 88 to allow the strip to pivot and allow access to space both above and below the strip 56. A first cartridge 54 containing a first plurality of fuel pellets 60 is disposed in chamber 28 below the heater strip 56 and a second cartridge 52 containing a second plurality of fuel pellets 60 is disposed on top of the heater strip 56 within chamber 28. As such, the first and second cartridges 54 and 52 sandwich the heater strip 56 as shown in FIG. 3. It should be appreciated that one or more fuel pellets 60 and one or more heaters 84 and 86 may be employed on each of the first and second sides of the strip 56.

The first cartridge 54 includes at least one fuel pellet 60. In the embodiment shown, four fuel pellets 60 are arranged end-to-end in series and separated by thermal insulators 62. Additionally, thermal insulators 62 are provided on opposite ends of the linear array of fuel pellets 60. A thermal insulation material 64, such as rubber, is formed substantially around the first cartridge 54 so as to cover at least first, second and third sides of the cartridge 54. A fourth side, shown as the top side, is left uncovered so as to expose the top side of the fuel pellets 60. As such, fuel pellets 60 are positioned in thermal communication with the heaters 84 provided on the bottom side of strip 56 when inserted within chamber 28.

The second cartridge 52 likewise includes one or more fuel pellets 60. In the embodiment shown, four fuel pellets 60 are arranged end-to-end in a linear array separated by thermal insulators 72. Additionally, thermal insulators 72 are provided at opposite ends of the second cartridge 52. A thermal insulation layer 74, such as rubber substantially covers three sides of the second cartridge 52 and leaves the bottom side of the fuel pellets 60 exposed. As such, the exposed side of the fuel pellets 60 is in thermal communication with the heaters 86 provided on the top surface of strip 56 when inserted into the chamber 28.

The thermal insulation 62, 64, 72 and 74 may include rubber, fiberglass, felt or dehydrated paper. Thermal insulation may include other thermal insulation materials. When the first cartridge 54 and second cartridge 52 are assembled together to sandwich the heater strip 56, the thermal insulation 64 and 74 of the first and second cartridges 54 and 52, respectively, abut one another at the periphery and provide thermal insulation to contain the heat within the space defined therebetween. Additionally, insulation materials 62 and 72 further isolates heat between adjacent fuel pellets.

Figure 6:
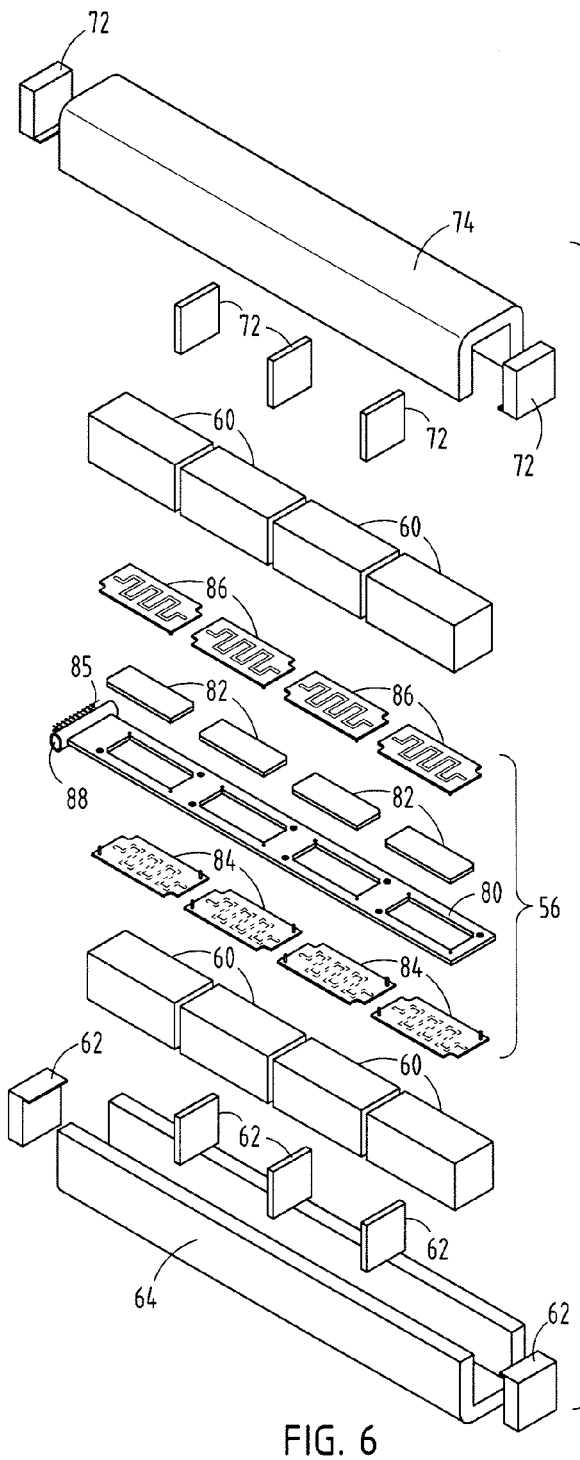
FIG. 6 is an exploded view of the hydrogen generator shown in FIG. 1.
Figure 7A:
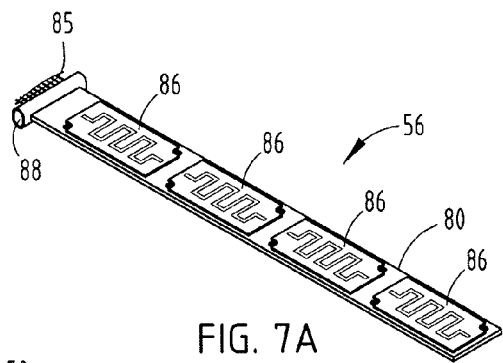
FIG. 7A is a top perspective view of the heater strip shown in FIG. 6.
Figure 7B:
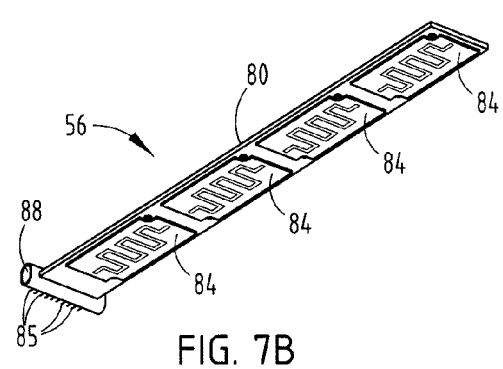
FIG. 7B is a bottom perspective view of the heater strip shown in FIG. 6.
Figure 8:
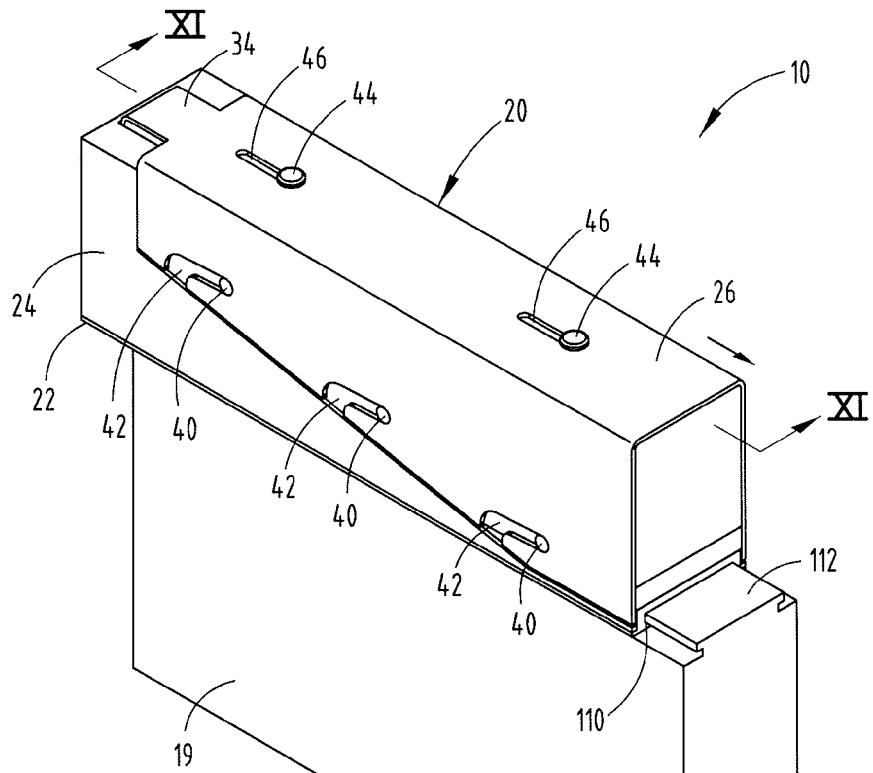
FIG. 8 is a perspective view of a hydrogen generator configured to connect to a fuel cell system, according to another embodiment.
Figure 9:
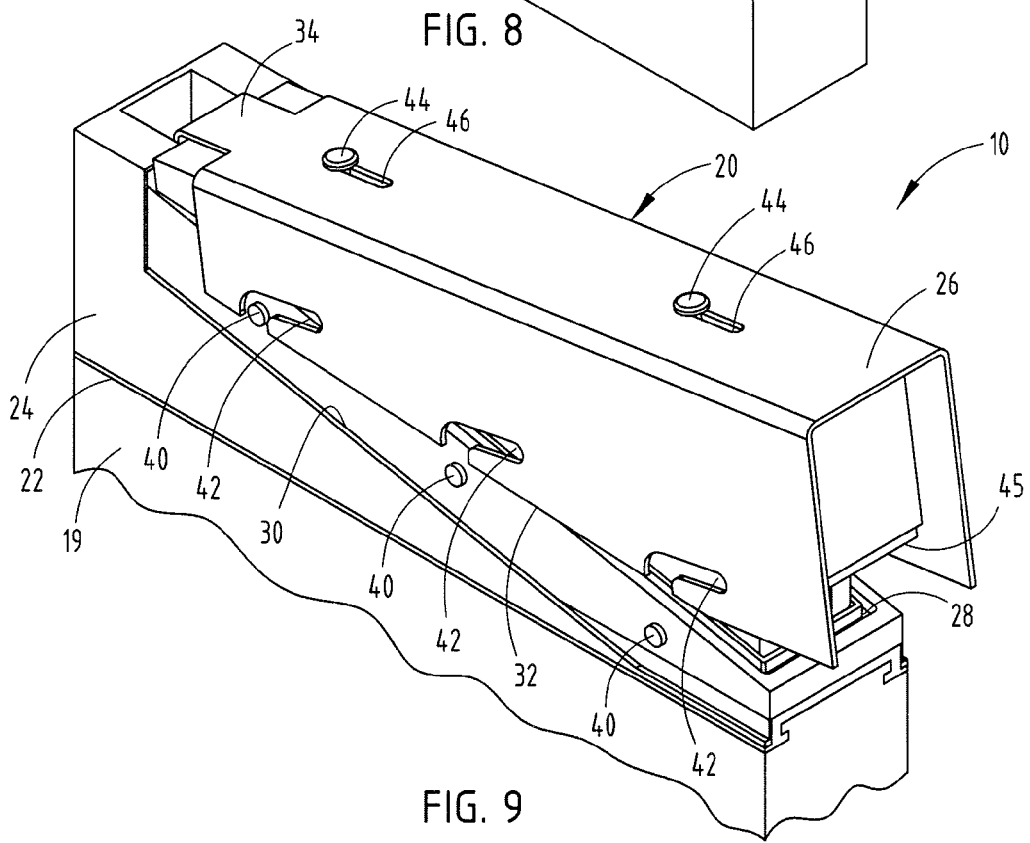
FIG. 9 is a perspective view of the hydrogen generator shown in FIG. 8 with the lid partially open.
Figure 10:
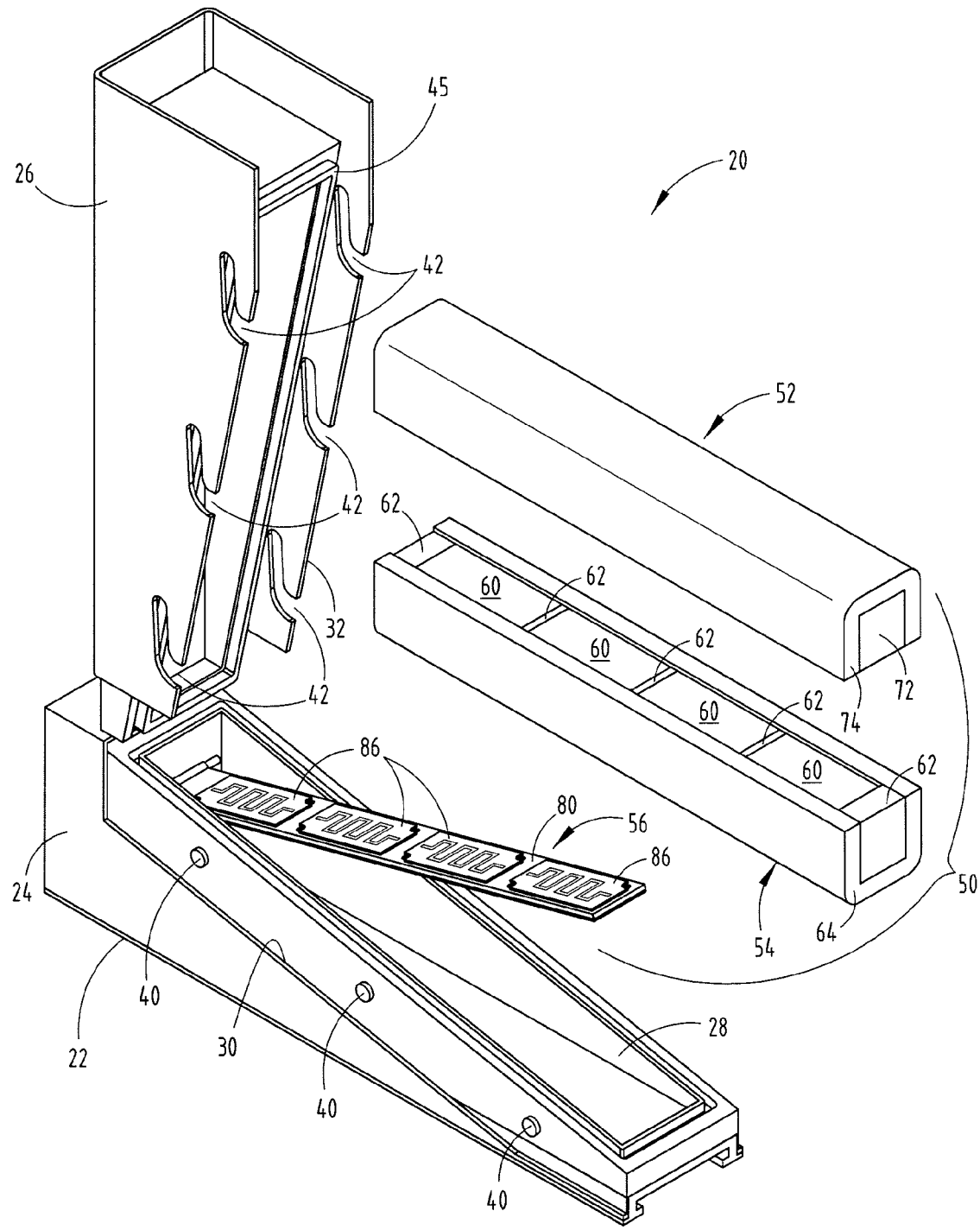
FIG. 10 is a perspective view of the hydrogen generator shown in FIG. 8 with the fuel pellet cartridges shown removed from the housing.

The heater strip 56 is shown in FIG. 6 having a central frame portion 80 with dielectric and thermally insulated pads 82 provided therein. Pads 82 serve as an electrically nonconductive and thermally insulated face onto which the heater elements 84 and 86 are assembled. Heater elements 84 are shown assembled to the bottom of pads 82 and heater elements 86 are shown assembled to the top side of pads 82. Heater strip 56 may include electrical circuitry printed or otherwise formed thereon to provide power supply to the heater elements 84 and 86. The electrical circuitry may include electrical conductors 85 shown extending from pivot pin 88 to allow electrical power connections.

Each of the fuel pellets 60 is shown having a generally rectangular shape, according to one embodiment. Each fuel pellet 60 is arranged to be in thermal communication with a single heater element 84 or 86, in the embodiment shown. The heater assembly include electrical conductors 85 extending from strip 56 for receiving electrical power to power the heaters and thereby generate heat. As a result, the heating elements 84 and 86 may be selected to energize selected fuel pellets 60 one or more at a time. When the heating element 84 and 86 generates heat, the heat is transferred to a fuel pellet 60 to initiate the release of hydrogen gas. It should be appreciated that one or more fuel pellets 60 may be heated at a given time and in a particular sequence as determined by a controller.

In operation, the hydrogen generator 20 may be controlled such that one or more heating elements 84 and 86 are activated to heat one or more fuel pellets 60 in cartridges 52 and 54 at a time. The hydrogen-containing material will release hydrogen gas when heated to a sufficient temperature, such as 160° C. to 200° C. The controller may control activation of one or more heating elements 84 and 86 at a time so as to supply heat to one or more fuel pellets 60 which, in turn, heats the hydrogen-containing material provided thereon. When a fuel pellet 60 is heated, hydrogen gas is generated. Byproduct, such as ash, may remain within the housing 22, while hydrogen gas is allowed to pass through a gas flow path and exit the gas outlet 12 for supply to a hydrogen consuming device, such as a fuel cell 14.

Once the cartridges 52 and 54 are fully consumed, the user may open the housing 22 by axially sliding and pivoting the lid 26 relative to the base 24 and removing the top cartridge 52 and bottom cartridge 54. Removal of the bottom cartridge 54 may be achieved by pivoting the heater strip 56 sufficiently upward to expose the storage space therebelow. The entire first and second cartridges 52 and 54 may be replaced or, individual fuel pellets 60 may be reinserted into the cartridges to allow re-use of certain components of the cartridge 52 and 54. The refilled or replaced cartridges 52 and 54 may then be reinserted into the chamber 28 above and below the heater strip 50 and the lid 26 closed relative to the base 24.

Referring to FIGS. 8-13B, a hydrogen generator 20 is illustrated according to another embodiment. Hydrogen generator 20 shown in this embodiment does not contain the fuel cell system within the same housing, but instead is adapted to be connected to a separate housing 19 of a fuel cell system 10 as shown. A T-shaped slot 110 is configured on the bottom wall of housing 22 of the hydrogen generator 20 which enables the hydrogen generator 20 to be slidingly connected onto the top of a fuel cell battery housing 19 via a T-shaped connector ban. As such, the hydrogen generator 20 is easily removed from the fuel cell battery housing 19.

The hydrogen generator 20 shown in FIGS. 8-13B includes a housing 22 having a base 24 and lid 26 that slides and pivots relative to the base 24 to open and close as described above in connection with the first embodiment. Additionally, first and second fuel cartridges 54 and 52 are disposed on opposite sides of the heater strip 56 as shown and described above. In this embodiment, the heater strip 56 is shown having an extended and flexible strip 81 which includes circuitry for carrying electrical contacts 85. The electrical contacts 85 matingly engage and provide electrical connection to a circuit board 100 shown disposed within the base 22. The circuit board 100 may provide individual contact lines for controlling each of the heater elements 84, 86, responsive to control circuitry.

Figure 11:
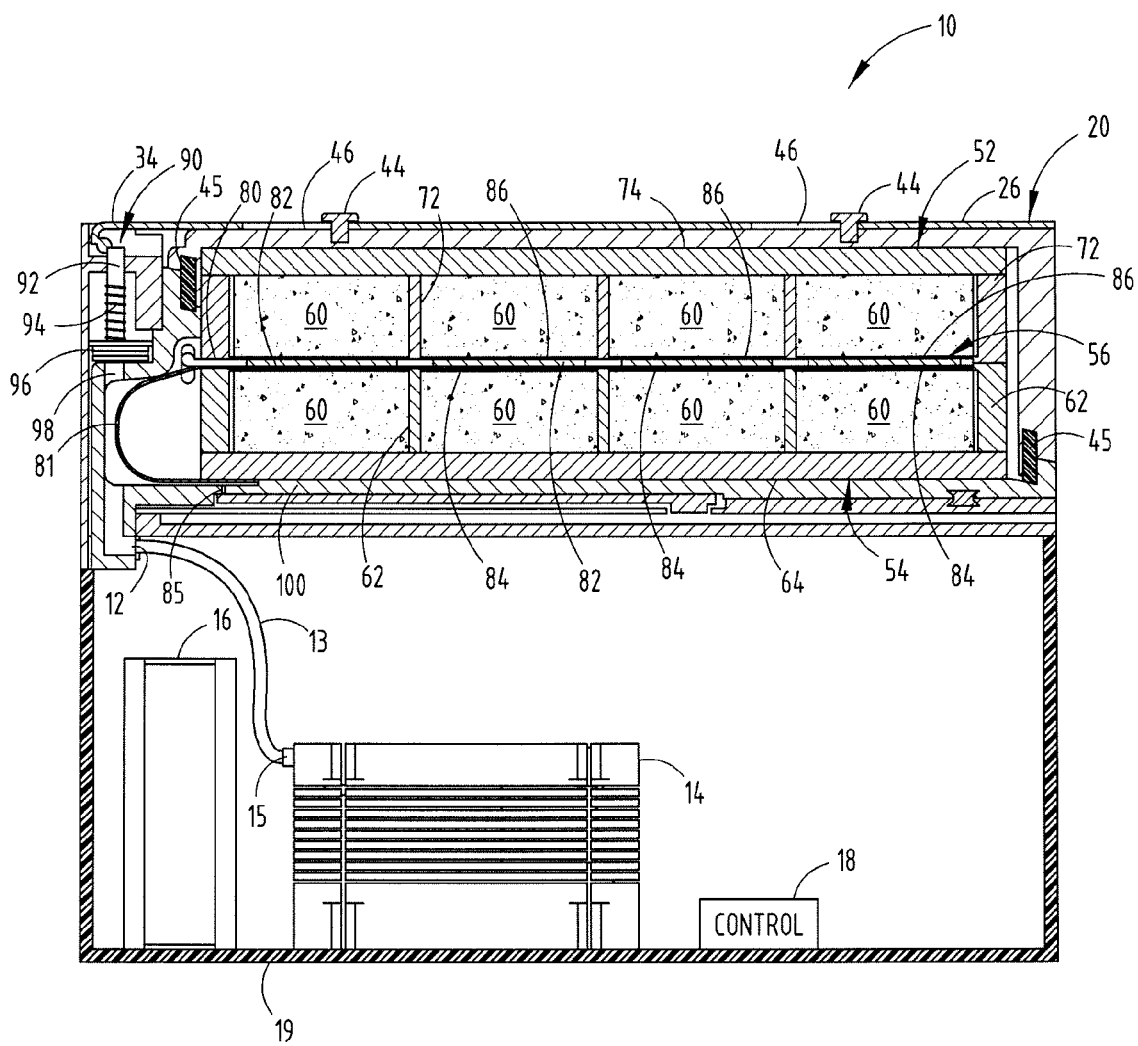
FIG. 11 is a cross-sectional view of the hydrogen generator and fuel cell system taken through line XI-XI of FIG. 8.
Figure 12:
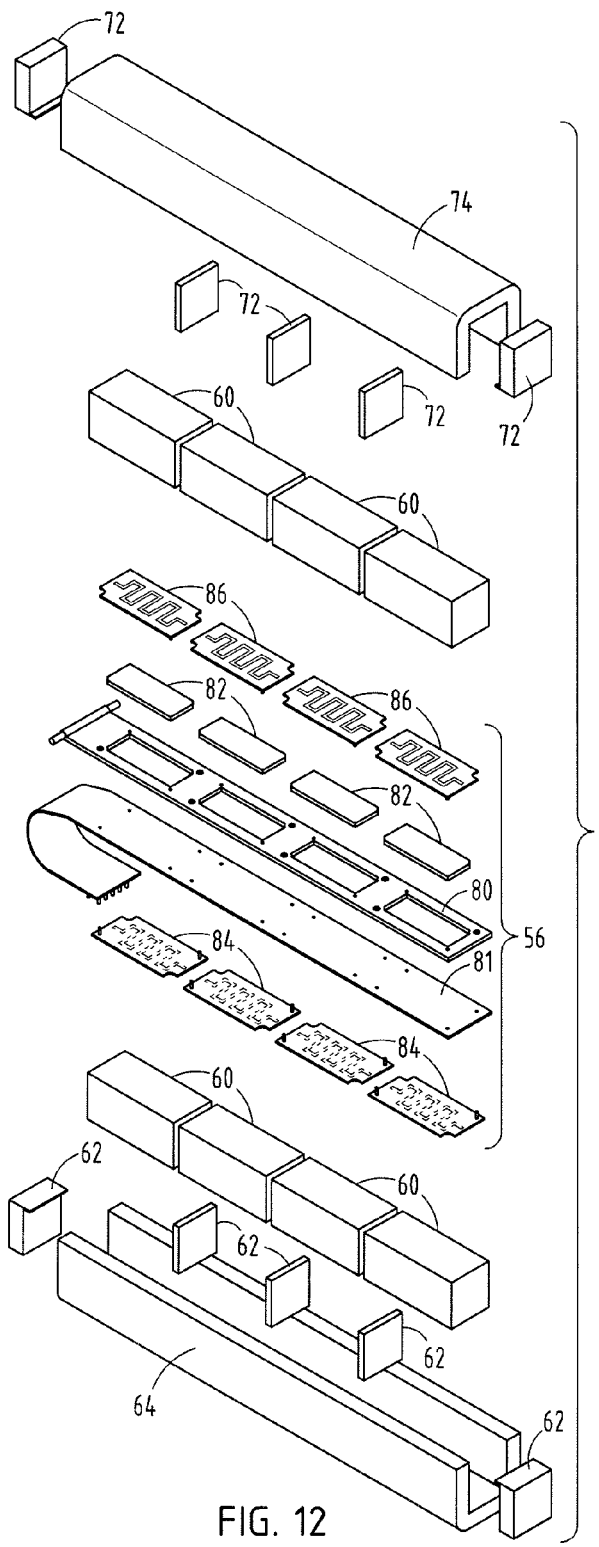
FIG. 12 is an exploded view of the hydrogen generator shown in FIG. 8.
Figure 13A:
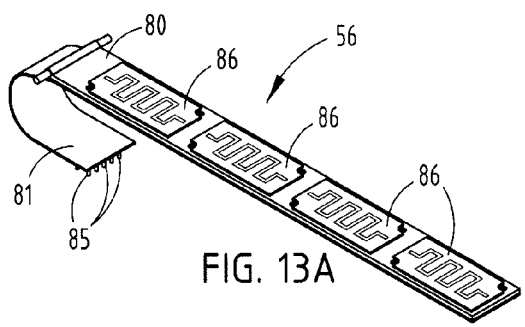
FIG. 13A is a top perspective view of the heater strip shown in FIG. 12.
Figure 13B:
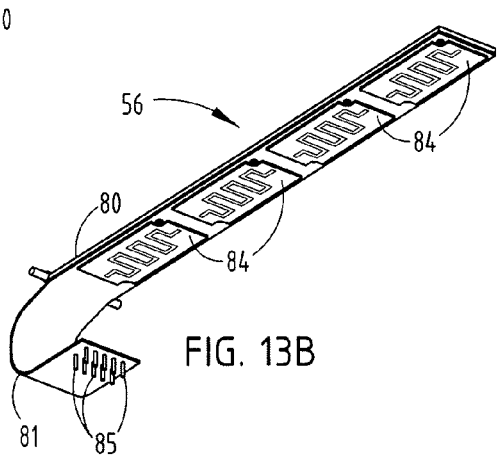
FIG. 13B is a bottom perspective view of the heater strip shown in FIG. 12.

Referring to FIG. 11, the hydrogen generator 20 is shown having various components of the fuel cell system 10 discussed above and further having an interlock mechanism 90 that locks the lid 26 closed relative to the base 24 when pressure in the housing 22 exceeds a predetermined pressure. The interlock mechanism 90 may include a spring biased interlock pin 92 in fluid communication with the internal pressure within the housing 22. The pin 92 moves as a function of the pressure between a lock and an unlocked position. When pressure in chamber 28 exceeds a predetermined pressure, the pin 92 is moved upward to the locked position, in which the lid 26 is prevented from opening relative to the base 24 such that a user may not open the housing 22 when gas pressure exceeds a predetermined pressure when the pressure is below the predetermined pressure, the pin moves downward to allow the lid 26 to open. An interlock mechanism could be incorporated into the embodiment of a hydrogen generator 20 as shown in FIGS. 1-7B FIGS. 1-13B show embodiments of hydrogen generators with cartridges having a single row of pellets, but as described above the pellets can be arranged in more than one row, each with a corresponding row of heater elements in the heater assembly. FIGS. 1-13B also show embodiments in which the lid and the strip pivot at a narrow end, but the hydrogen generator could be modified so they can pivot at another end. As describe above, the embodiments in FIGS. 1-13B could be modified by disposing the heater elements in the cartridges, with the strip including electrical contacts to carry electrical energy to the heater elements.

The above description is considered that of the preferred embodiments only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the Doctrine of Equivalents.

The invention claimed is:

1. A hydrogen generator comprising:
   a housing comprising a base connected to a lid, wherein the housing defines a chamber;
   a heater assembly disposed in the chamber and comprising a strip and a first heating element on a first side of the strip and a second heating element on an opposite second side of the strip, the strip further comprising electrical conductors for receiving electrical power to power the first heating element and second heating element;
   a first cartridge disposed on the first side of the strip and comprising a first fuel pellet in thermal communication with the first heating element, wherein the first fuel pellet comprises a hydrogen-containing material that will release hydrogen gas when heated; and,
   a second cartridge disposed on the second side of the strip and comprising a second fuel pellet in thermal communication with the second heating element, wherein the second fuel pellet comprises a hydrogen-containing material that will release hydrogen gas when heated;
   wherein the strip is pivotally connected to the housing such that the strip pivots to allow access to the first cartridge, the strip having an extended and flexible circuitry strip which matingly engages and provides an electrical connection between the electrical conductors and a circuit board disposed within the base.

2. The hydrogen generator of claim 1, wherein the heater assembly comprises a first plurality of heating elements on the first side of the strip and a second plurality of heating elements on the second side of the strip, wherein the first cartridge comprises a first plurality of fuel pellets aligned in thermal communication with the first plurality of heating elements and the second cartridge comprises a second plurality of fuel pellets aligned in thermal communication with the second plurality of heating elements.

3. The hydrogen generator of claim 1, wherein each of the first and second cartridges comprises a thermal insulating material substantially coating the fuel pellets.

4. The hydrogen generator of claim 3, wherein the thermal insulation material of the first cartridge abuts the thermal insulation material of the second cartridge.

5. The hydrogen generator of claim 1, wherein the first cartridge is disposed to interface with a bottom side of the strip and the second cartridge is disposed to interface with a top side of the strip.

6. The hydrogen generator of claim 1, wherein the lid is pivotally connected to the base and pivots between open and closed positions.

7. The hydrogen generator of claim 1, wherein one of the lid and base comprises a plurality of slots and the other of the lid and base comprises a plurality of pins such that the pins move along a cammed surface of the slots as the lid moves between open and closed positions.

8. The hydrogen generator of claim 7, wherein the lid further moves axially away from the base.

9. The hydrogen generator of claim 1 further comprising a seal disposed between the lid and the base.

10. The hydrogen generator of claim 1 further comprising an interlock mechanism that locks the lid closed relative to the base when pressure in the housing exceeds a predetermined pressure.

11. The hydrogen generator of claim 1 further comprising a hydrogen outlet coupled to the housing in fluid communication with each of the fuel pellets to provide a hydrogen outlet path.

12. The hydrogen generator of claim 1 further comprising a controller for controlling activation of each of the heating elements to selectively heat one or more of the fuel pellets at a time.

13. The hydrogen generator of claim 1, wherein the hydrogen generator is adapted to be coupled to a fuel cell to supply hydrogen to the fuel cell.

14. The hydrogen generator of claim 1, wherein the housing is removably connected to the fuel cell.

15. The hydrogen generator of claim 1, wherein the fuel cell is located within the housing.

16. A fuel pellet assembly for a hydrogen generator, said fuel pellet assembly comprising:
   a first cartridge comprising a first plurality of fuel pellets, the first cartridge having an exposed first side and second, third and fourth sides substantially covered by a first thermal insulation;
   a second cartridge comprising a second plurality of fuel cells, the second cartridge having a first exposed side and second, third and fourth sides substantially covered by a second thermal insulation; and,
   a heater strip comprising a first side, an opposite second side, a first plurality of heating elements on the first side in thermally communication with the first side of the first cartridge, and a second plurality of heating elements on the second side in thermal communication with the second side of the cartridge, wherein the heating elements selectively heat one or more of the first and second plurality of fuel pellets, the heater strip further comprising electrical conductors for receiving electrical power to power the first plurality of heating elements and the second plurality of heating elements;

wherein the heater strip is configured to pivotally connect to a housing such that the heater strip may pivot to allow access to one of the first cartridge and the second cartridge that is located below the heater strip, the heater strip further comprising an extended and flexible circuity strip which is configured to matingly engage and provide an electrical connection between the electrical conductors and a circuit board disposed within the housing.

17. The fuel pellet assembly of claim 16, wherein the first thermal insulation of the first cartridge abuts the second thermal insulation of the second cartridge.

18. The fuel pellet assembly of claim 16, wherein the second cartridge is located on top of the heater strip and the first cartridge is located below the heater strip.

19. A fuel cell system comprising:
a fuel cell comprising a hydrogen gas inlet; and
a hydrogen generator comprising:
    a housing comprising a base pivotally connected to a lid, wherein the housing defines a chamber, the housing comprising a hydrogen gas outlet in fluid communication with the hydrogen gas inlet;
    a heater assembly disposed in the chamber and comprising a strip and a first heating element on a first side of the strip and a second heating element on an opposite second side of the strip, the strip further comprising electrical conductors for receiving electrical power to power the first heating element and second heating element;
    a first cartridge disposed on the first side of the strip and comprising a first fuel pellet in thermal communication with the first heating element, wherein the first fuel pellet comprises a hydrogen-containing material that will release hydrogen gas when heated; and
    a second cartridge disposed on the second side of the strip and comprising a second fuel pellet in thermal communication with the second heating element, wherein the second fuel pellet comprises a hydrogen-containing material that will release hydrogen gas when heated;
    wherein the strip is pivotally connected to the housing such that the strip pivots to allow access to the first cartridge, the strip having an extended and flexible circuity strip which matingly engages and provides an electrical connection between the electrical conductors and a circuit board disposed within the base.

20. A hydrogen generator comprising:
a housing comprising a base connected to a lid, wherein the housing defines a chamber;
a strip comprising a first plurality of electrical contacts on a first side of the strip and a second plurality of electrical contacts on an opposite second side of the strip, the strip further comprising electrical conductors for receiving electrical power to power the first plurality of electrical contacts and the second plurality of electrical contacts;
a first cartridge disposed on the first side of the strip and comprising a first fuel pellet, wherein the first fuel pellet comprises a hydrogen-containing material that will release hydrogen gas when heated;
a second cartridge disposed on the second side of the strip and comprising a second fuel pellet, wherein the second fuel pellet comprises a hydrogen-containing material that will release hydrogen gas when heated;
a first heating element arranged on or in the first fuel pellet and electrically coupled to the first plurality of electrical contacts, wherein the first plurality of electrical contacts provide electrical energy to the first heating element; and,
a second heating element arranged on or in the second fuel pellet and electrically coupled to the second plurality of electrical contacts, wherein the second plurality of electrical contacts provide electrical energy to the second heating element.

21. The hydrogen generator of claim 20, wherein the strip is pivotally connected to the housing such that the strip pivots to allow access to the first cartridge, the strip having an extended and flexible circuity strip which matingly engages and provides an electrical connection between the electrical conductors and a circuit board disposed within the base.

* * * * *